Sept. 26, 1933.   L. A. KAHN ET AL   1,928,381
VAULT VENTILATOR
Filed Dec. 30, 1931   2 Sheets-Sheet 1
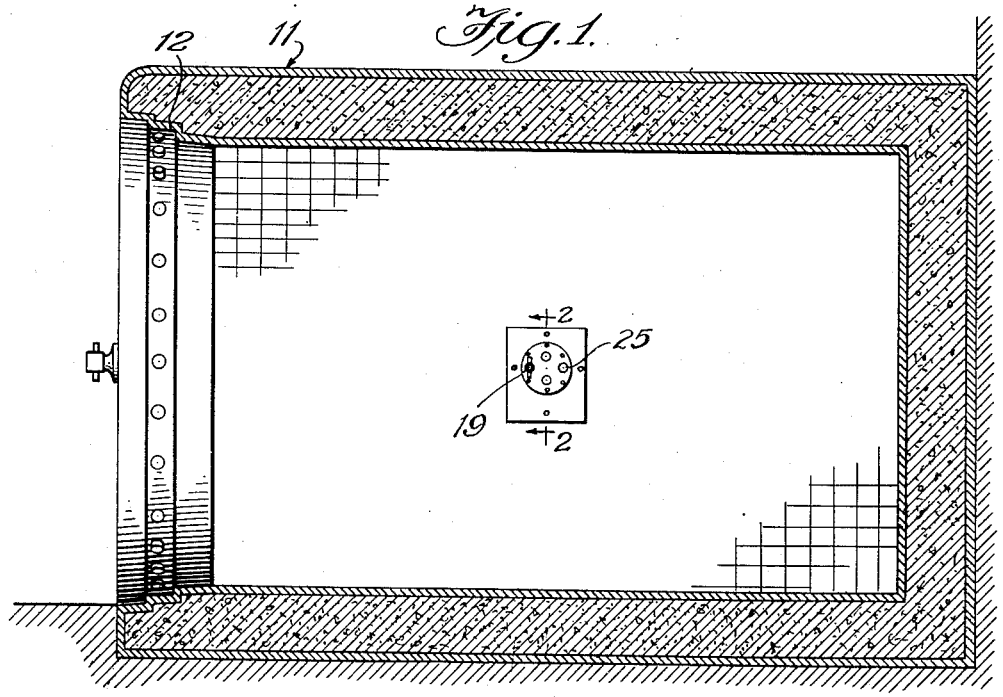
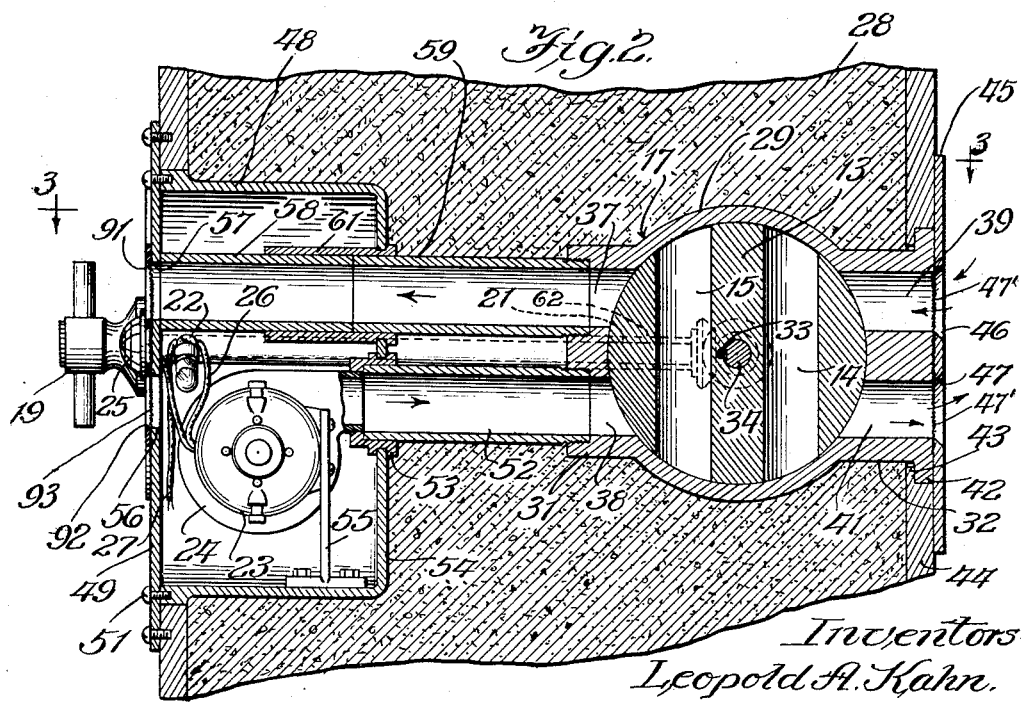
Inventors
Leopold A. Kahn.
Fred L. Pearson.
By Williams, Bradbury,
McCaleb & Hinkle, Attys.

Sept. 26, 1933.  L. A. KAHN ET AL  1,928,381
VAULT VENTILATOR
Filed Dec. 30, 1931  2 Sheets-Sheet 2
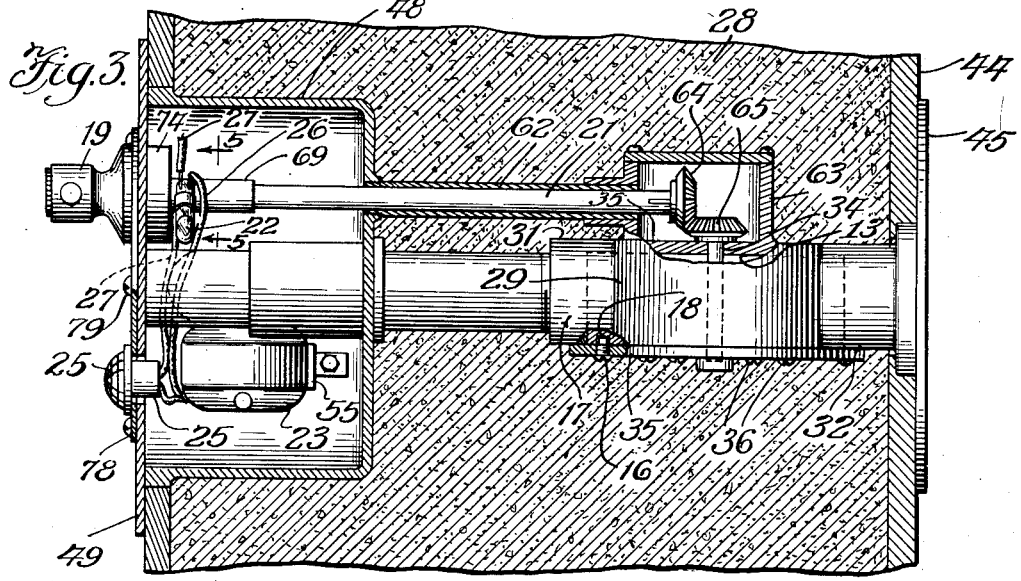
Fig.3.
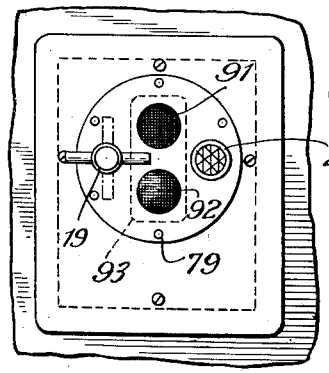
Fig.4.
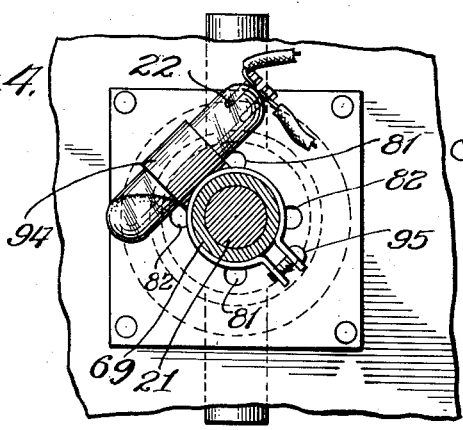
Fig.5.
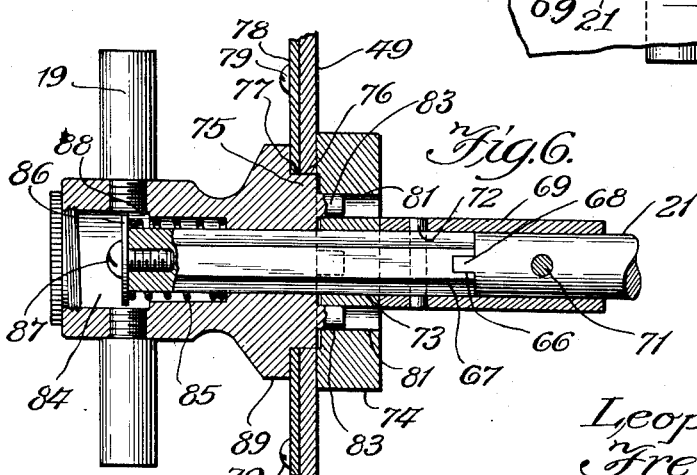
Fig.6.
Inventors
Leopold A. Kahn.
Fred L. Pearson.
By Williams, Bradbury,
McCaleb & Hinkle, Attys Patented Sept. 26, 1933

1,928,381

UNITED STATES PATENT OFFICE 1,928,381

VAULT VENTILATOR

Leopold A. Kahn and Fred L. Pearson, Chicago, Ill., assignors, by direct and mesne assignments, to Bankers Electric Protective Association, Boston, Mass., a corporation of Massachusetts Application December 30, 1931
Serial No. 583,872

4 Claims. (Cl. 109—1)

This invention relates in general to ventilators, and has more particular reference to ventilators of the type adapted to be carried in a wall of an enclosure to provide circulation of air between the outside and the inside of the enclosure.

Included among the objects of our invention, are, to provide a compact and efficient ventilator having a rotatable member with spaced passages therethrough, whereby communication between the inside and outside of the enclosure is controlled by rotation of this rotatable member; to provide a positive stop limiting the throw or rotation of the rotatable member between an opened position where the spaced passages complete the communication between the inside and the outside of the enclosure, and a closed position where the rotatable member prevents such communication; to provide simple operating connections accessible from within the enclosure, but inaccessible from without the enclosure, which have locking means for holding the rotatable member in an open or a closed position, and for preventing this member from reversing its direction of rotation at the end of its throw where it is stopped as mentioned above; to utilize the operating connections for automatically actuating electrical apparatus associated with the rotatable member to produce a circulation of air between the inside and the outside of the enclosure when the rotatable member is at the open position, and to indicate the operation of the ventilator; and in general, to provide simple vault ventilating means for clearing and replenishing the air of a vault after closed periods thereof, or during enforced or accidental "lock-ins" without weakening the burglary resistance of the vault, but instead facilitating communication between persons locked in the vault and those outside thereof.

Other objects and advantages of the invention will be apparent from the following description, and from the accompanying drawings, in which similar characters of reference indicate similar parts throughout the several views.

Referring to the drawings;

Fig. 1 is a sectional view of a vault equipped with a ventilator embodying the features of our invention;

Fig. 2 is an enlarged fragmentary section taken substantially on the line 2—2 of Fig. 1;

Fig. 3 is a cross-section taken substantially on the line 3—3 of Fig. 2;

Fig. 4 is an enlarged elevation of our novel ventilator as seen from inside an enclosure equipped therewith;

Fig. 5 is an enlarged section taken substantially on the line 5—5 of Fig. 3; and Fig. 6 is a sectional detail of the ventilator operating handle and drive coupling.

Enclosures and premises for the storage and protection of valuables, such, for example, as the safety deposit box vault shown at 11 in Fig. 1, are usually constructed of reinforced concrete or masonry, and are frequently lined and covered with sheet steel to resist a burglarious attack through the walls of the vault. Such vaults are provided with tight fitting doors 12 which make plug fits so that during the ordinary closed period, the atmosphere within the vault becomes stale or stagnant and requires, at frequent intervals, a change of, or additional air.

Moreover, ventilation of such vaults is often required to sustain life within the vault in cases of accidental "lock-ins" or during enforced "lock-ins" to prevent the spreading of an alarm by persons present during a daylight raid or hold-up.

It is an object of our invention to provide novel and improved vault ventilating means which will quickly replenish the air within a vault, either while the vault is closed, or upon opening of the vault after a closed period. To this end we provide a rotatable member or valve 13 having spaced passages 14 and 15 extending therethrough transversely of the axis of rotation thereof. This valve 13 is rockable or rotatable between limits fixed by a stop pin or lug 16 carried on a valve housing 17 and engaging in an arcuate slot 18 in an end of the rotor or valve 13, a handle 19 being coupled to a drive shaft 21 for so rocking the valve 13. The operation of the valve 13 by means of the handle 19, actuates switch means 22 for controlling such electrical apparatus as a motor 23, a blower 24 driven thereby, and an indicator or pilot light 25 in response to the operation of the rotor or valve 13.

The switch means 22, the motor 23, and the light 25 are electrically connected by conductors 26 and are adapted to receive electrical energy from a suitable source, not shown, through conductors 27. In this manner the motor 23 and hence the blower 24, operate only when the valve 13 is opened, and the light 25 indicates the position of the valve and the operation of the motor.

The valve housing 17 is adapted to be carried in a wall 28 of the vault 11 and comprises a cylindrical or drumshaped portion 29 and diametrically opposed tubular portions 31 and 32 integral with the cylindrical portion 29. The cylindrical portion 29 carries therein the rotor or valve 13 keyed or locked as at 33 to a shaft 34 journaled in the ends or sides 35 of the housing. One of the sides 35 serves as a closure member for the housing, and is held thereto by retaining bolts 36, the locking pin or lug 16 being carried in this removable side of the housing.

Upon rotation of the valve 13 by the handle 19 to open the valve, the passages 14 and 15 establish or effect communication between passages 37 and 38 and passages 39 and 41 respectively, in the tubular projections or portions 31 and 32.

The projection 32 is provided with a shoulder or flange 42 complementary with an internal flange 43 of a vault plate 44 on the wall 28 to facilitate mounting the ventilator. A finish or escutcheon plate 45 having ports or apertures 46 and 47 corresponding to the passages 39 and 41, respectively, is suitably secured to the plate 44 and serves to hold a screen 47' between the plate 45 and the plate 44 for finishing and screening the ports 46 and 47.

At the inside of the vault we provide a housing 48 having a cover plate 49 secured to the housing by retaining screws 51. The housing may be carried within the vault or as shown in Fig. 2, it may be carried in the wall 28 thereof. This housing 48 is connected to the valve housing 17 by means of an exhaust pipe 52 communicating at one end with the passage 38 in the valve housing, and at the other end extending through a suitable coupling 53 in a wall 54 of the housing 48 for communication with the blower 24 coupled to the motor 23, the motor 23 and the blower 24 being carried in the housing by a mounting standard or bracket 55.

The housing 48 communicates directly with the vault 11 through an aperture or a port 56 in the cover plate 49, by means of which air is exhausted from the vault when the passage 15 in the valve registers with the passages 38 and 41 in the valve housing. When the valve passage 15 so registers with the passages 38 and 41, the vault 11 is in direct communication with the outside by virtue of an intake port 57 in the plate 49, a pipe 58 extending from the port 57 to an intake pipe 59 to which it connects by a coupling sleeve 61 carried in the wall 54 of the housing 48, and the then aligned passages 37, 14 and 39, the intake 59 connecting the passage 37 in the valve housing and the pipe 58 for this purpose. The handle 19 is adapted to rotate the shaft 21 which is enclosed by a sleeve 62 connecting the housing 48 and a casing 63 adjacent the valve housing 17. The casing 63 carries therein a beveled gear 64 on the end of the shaft 21 and an enmeshing beveled gear 65 on the valve shaft 34. Thus, upon rotation of the handle 19, the rotor or valve 13 may be operated to control the circulation of air between the inside and the outside of the vault.

Our novel handle 19, as seen more particularly in Fig. 6, connects with the shaft 21 by means of a slot 66 in the end of a polygonal shaft 67 and a lug 68 on the shaft 21. A coupling sleeve 69 pinned as at 71 to the shaft 21, and as at 72 to the shaft 67, completes the coupling so that upon rotation of the polygonal shaft 67, the shaft 21 rotates to drive the valve 13. This polygonal shaft 67 passes through an aperture 73 in a boss or stationary locking member 74 at the inner side of the cover plate 49, and into the handle 19 which has a hub or boss portion 75 at this end slidably receivable in an aperture 76 in the cover plate 49, and an aperture 77 in a front or an escutcheon plate 78 secured adjacent the cover plate by mounting screws 79. The stationary locking member 74 is provided with spaced depressions or apertures 81 and 82 cooperating with lugs or pins 83 carried on the handle to prevent a reversal of the valve 13 when the valve is stopped at either the open or closed position by the pin or lug 16 engaging in the arcuate slot 18.

The handle is of hollow construction to receive the polygonal shaft 67 and is provided with a chamber 84 into which the shaft 67 extends. A coil spring 85 is seated between the end of the chamber and the spring seat or washer 86 secured on the shaft by a retaining screw 87 to permit sliding the handle axially of the shaft 67 until the lugs or pins 83 disengage the depressions or apertures 81, whereupon the washer 86 by engagement with an internal shoulder 88, stops a further retraction of the handle. When so retracted, the handle and hence the polygonal shaft 67 connected to the drive shaft of the rotor, may be rotated until the stop pin 16 engages the end of the arcuate slot 18.

At this position of the handle, the handle moves forward under the action of the coil spring 85 until stopped by engagement of a shoulder 89 of the handle with the plate 78, the pins or lugs 83 entering the apertures 82 to prevent a reversal of the rotor or valve 18. When the lugs 83 are engaged in the apertures 82, the passages 14 and 15 in the valve 13 are aligned with the intake and exhaust pipes 59 and 52, respectively, so that air may be forced out of the vault by the blower 24 and the air within the vault replenished through the inlet port 46.

The plate 78, besides finishing the end of the ventilator, has ports 91 and 92 communicating with the ports 56 and 57 in the plate 49, which are covered by screen 93 held between the plates 49 and 78 for finishing the ports and for preventing dirt and other foreign matter from being forced into and out of the vault.

The operation of the motor and blower may be automatic as the handle 19 is rotated to the open position. In order to accomplish this, the switch means 22 may take the form of a mercury switch actuated upon operation of the handle. Preferably as shown in Fig. 5, the mercury switch 22 may be mounted on the coupling sleeve or connector 69 by means of a spring clip or bracket 94 embracing the sleeve 69 and held thereon by a clamping screw 95.

It will thus be seen that we have succeeded in providing an efficient vault ventilator which may be mounted in a wall of a vault, and which is easily operable from within the vault to produce ventilation thereof. When sufficient force is applied at the operating handle to set the rotatable valve in motion, the fly wheel effect or inertia of the rotatable valve assists in its operation and causes the valve to continue to rotate until it is positively stopped by the lug 16 engaging the end of the arcuate slot, whereupon the pins 83 on the valve handle, by engagement in the apertures 81 and 82, prevent a reversal of the valve and lock it in the open or closed position until the handle 19 is again retracted and rotated. By our novel and improved ventilator, a circulation of air between the inside and outside of a vault may be produced, simply by retracting the operating handle and applying a rotating force thereto so that the valve rotates until the stop lug 16 and the spring locking feature of the handle stops and locks the valve in the open position. In so rotating the valve actuated by the manual force applied at the handle operates the switch 22, starting the motor and blower and lighting the indicator to force air out of the vault and permit new air to enter the vault, the light indicating to the operator that the ventilator is functioning. This operation requires about one second.

Having thus described our invention, what we claim as new and desire to secure by Letters Patent of the United States, is:

1. The combination with a vault wall structure of a rotatable shaft substantially parallel to said structure, and a cylindrical body coaxially fixed on said shaft for rotation therewith and having spaced chordal passages for establishing and interrupting communication between the opposite sides of said structure.

2. The combination with a vault wall structure of a cylindrical casing in said structure and substantially parallel thereto, said casing having in the periphery thereof an inlet port and an outlet port for communicating with the atmosphere at one side of said structure and having an inlet port and an outlet port for communicating with the atmosphere at the opposite side of said structure, and a drum rotatable coaxially with and in said casing and having a chordal inlet passage registerable with said inlet ports and having an outlet chordal passage registerable with said outlet ports for establishing communication between opposite sides of said structure.

3. A vault ventilator comprising tubular means positionable in a vault wall structure for communication with the atmosphere at one side thereof, other tubular means axially spaced from the first said means in said structure for communication with the atmosphere at the opposite side of said structure, a ventilator casing adapted to be mounted in the vault wall structure and communicating at one side with the first said tubular means and at the other side with said other tubular means, a rockable valve member having its axis extending transversely of both said tubular means and having a plurality of transverse passages, for establishing and interrupting communication through said passages in said valve member between the first said tubular means and said other tubular means.

4. A vault ventilator for providing communication between the inside and the outside of a vault, comprising a casing having a cylindrical portion adapted to be mounted in a wall of the vault with the axis of said cylindrical portion extending substantially parallel to the major plane of said wall, juxtaposed tubular members communicating with said cylindrical portion at a peripheral side thereof and adapted to communicate with the inside of the vault, other juxtaposed tubular members communicating with said cylindrical portion at the opposite peripheral side and adapted to communicate with the outside of said vault, a rockable shaft coaxially arranged in said cylindrical portion and extending outside thereof, and a cylindrical body coaxially fixed on said shaft for rocking therewith in said cylindrical portion of said casing, and having spaced chordal passages registerable with the first said juxtaposed tubular members and said other juxtaposed tubular members.

LECPOLD A. KAHN.
FRED I. PEARSON.